United States Patent
Kikuchi (10) Patent No.: US 7,451,608 B2
(45) Date of Patent: Nov. 18, 2008

(54) COOLING SYSTEM FOR POWER STORAGE MECHANISM, COOLING METHOD OF THE SAME, AND VEHICLE

(75) Inventor: Yoshiaki Kikuchi, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 603 days.

(21) Appl. No.: 11/016,739

(22) Filed: Dec. 21, 2004

(65) Prior Publication Data

US 2005/0138941 A1    Jun. 30, 2005

(30) Foreign Application Priority Data

Dec. 26, 2003    (JP)    ............... 2003-433305

(51) Int. Cl.
F25D 17/04    (2006.01)
F25D 23/12    (2006.01)
A47F 3/04    (2006.01)

(52) U.S. Cl. ............... 62/186; 26/259.2; 26/244
(58) Field of Classification Search .......... 62/178, 62/244, 259.2, 186, 239, 408, 409, 428; 165/202, 165/41; 180/68.1, 68.5
See application file for complete search history.

(56) References Cited

U.S. PATENT DOCUMENTS 5,490,572 A * 2/1996 Tajiri et al. ............ 180/65.1
5,937,664 A * 8/1999 Matsuno et al. ........... 62/259.2
2003/0082438 A1* 5/2003 Kwon .................... 429/120

FOREIGN PATENT DOCUMENTS

| JP | 10-306722 | 11/1998 |
|---|---|---|
| JP | 11-178115 | 7/1999 |
| JP | 2000 059917 A | 2/2000 |

OTHER PUBLICATIONS

Japanese Language Version of Japanese Office Action, Appln. No. 2003-433305 issued Jun. 12, 2007.
English Translation of Japanese Office Action, Appln. No. 2003-433305 issued Jun. 12, 2007.

* cited by examiner

Primary Examiner—Chen-Wen Jiang
(74) Attorney, Agent, or Firm—Kenyon & Kenyon LLP

(57) ABSTRACT

A battery pack is communicated with a luggage compartment via an outlet such that cooling air that has been heat transferred with a battery is released into the luggage compartment. A ventilation hole is formed in a rear portion of the luggage compartment. An inlet is opened toward the outside of the vehicle. An exhaust fan that discharges the cooling air at the temperature increased through heat transfer with the battery in the battery pack is provided to the front of the ventilation hole.

9 Claims, 7 Drawing Sheets

COOLING SYSTEM FOR POWER STORAGE MECHANISM, COOLING METHOD OF THE SAME, AND VEHICLE

INCORPORATION BY REFERENCE

The disclosure of Japanese Patent Application No. 2003-433305 filed on Dec. 26, 2003, including the specification, drawings and abstract are incorporated herein by reference in its entirety.

BACKGROUND OF THE INVENTION

1. Field of Invention

The invention relates to a cooling system for a power storage mechanism, and more particularly to a cooling system for a power storage mechanism for discharging air that has been heat transferred with the power storage mechanism therefrom into the interior of a vehicle.

2. Description of Related Art

Hybrid vehicles, fuel cell vehicles, electric vehicles and the like, driven by the driving force of the motor have been well known. The vehicle of the above type is equipped with a battery, capacitor and the like so as to store electricity supplied to the motor. As the battery and the capacitor generate heat upon charging or discharging of electricity, they need to be cooled.

JP-A-10-306722 discloses a cooling system for efficiently cooling the battery with air within the vehicle compartment. The cooling system designed to cool the battery within the battery chamber. The cooling system is provided with a cooling duct having one end opened to the vehicle interior and the other end connected to the battery chamber, a cooling fan provided within the cooling duct. The cooling system is provided with an exhaust duct disposed opposite to the cooling duct with respect to the battery, having one end opened to the outside of the vehicle and the other end opened to the interior of the battery chamber. Air in the vehicle compartment is supplied to the inside of the battery chamber as cooling air upon drive of the cooling fan. The air heat transferred with the battery is discharged to the outside of the vehicle via the exhaust duct.

According to the aforementioned system, the cooling air may be discharged to the outside of the vehicle via the exhaust duct.

The aforementioned system, however, requires a space for the exhaust duct. This may reduce the space of the cabin compartment or the luggage compartment. If the size of the exhaust duct is reduced, that is, its radius is reduced in order to have sufficient space for the cabin compartment or the luggage compartment, the pressure loss in the exhaust duct may occur, thus deteriorating the cooling performance.

SUMMARY OF THE INVENTION

It is an object of the invention to provide a cooling system for a power storage mechanism, cooling method of the same and vehicle that are capable of restraining an influence exerted to a vehicle interior space and a pressure loss.

A cooling system for a power storage mechanism according to the invention serves to cool the power storage mechanism equipped in a vehicle. The cooling system includes a unit that serves to release air that has been heat transferred with the power storage mechanism therefrom into an interior of the vehicle, and an exhaust fan that discharges the heat transferred air from the interior to an exterior of the vehicle.

In the cooling system, air that has been heat transferred with the power storage mechanism is released therefrom into a vehicle interior from the power storage mechanism, and further discharged to the outside of the vehicle from the power storage mechanism into the vehicle interior using the exhaust fan. The cooling system makes it possible to discharge the heat transferred air to the outside of the vehicle, requiring no exhaust duct that bypasses the vehicle interior to communicate between the power storage mechanism and the outside of the vehicle. The above structured cooling system makes it possible to restrain the influence exerted to the vehicle interior apace as well as the pressure loss.

According to the aforementioned cooling system, the vehicle is equipped with an air conditioning unit that conditions a state of air. The cooling system is provided with a control unit for controlling an operation of the exhaust fan in accordance with an operation of the air conditioning unit.

According to the aforementioned cooling system, the control unit serves to control the exhaust fan in accordance with the operation of the air conditioning unit, equipped with the vehicle, for conditioning the state of air. In the case where the air conditioning unit is operated in an inside air circulation mode, the exhaust fan is operated to forcedly discharge such that air at a temperature increased by heat transfer with the power storage mechanism. In the case where the air conditioning unit is operated in an outside air introduction mode, air that has been heat transferred with the power storage mechanism is forced to the outside of the vehicle together with the introduced outside air. Accordingly the exhaust fan is stopped so as to avoid unnecessary operation of the exhaust fan.

According to the cooling system as aforementioned, the air conditioning unit includes a member that serves to introduce air from the exterior into the interior of the vehicle, and the control unit serves to restrain an operation of the exhaust fan when the air is introduced from the exterior into the interior of the vehicle. According to the cooling system, the air conditioning unit includes a member that serves to selectively change a state of the air conditioning unit between a mode in which air is introduced from the exterior into the interior of the vehicle, and a mode in which the air within the interior of the vehicle is circulated; and the control unit serves to operate the exhaust fan at the mode in which the air within the interior of the vehicle is circulated, and to restrain an operation of the exhaust fan in the mode in which air is introduced from the exterior into the interior of the vehicle.

In the aforementioned cooling system, the exhaust fan is operated in the inside air circulation mode of the air conditioning unit. The operation of the exhaust fan is restrained in the outside air introduction mode of the air conditioning unit. In the inside air circulation mode, the exhaust fan is operated to forcedly discharge air at a temperature increased by heat transfer with the power storage mechanism to the outside of the vehicle. In the outside air introduction mode, operation of the exhaust fan is restrained as air at a temperature increased by heat transfer with the power storage mechanism is forced to the outside of the vehicle with the introduced outside air. This makes it possible to avoid unnecessary operation of the exhaust fan.

The aforementioned cooling system further includes a cooling member that cools the power storage mechanism, and an operation of the exhaust fan is controlled in accordance with an operation of the cooling member.

In the aforementioned cooling system, the exhaust fan is controlled in accordance with the operation of the cooling member. In the case where the cooling member is operated to cool the power storage mechanism, the exhaust fan is activated. Meanwhile, in the case where an operation of the cooling member is stopped and the power storage mechanism is not cooled, the exhaust fan may be stopped. This makes it possible to avoid unnecessary operation of the exhaust fan.

In the aforementioned cooling system, the cooling member is formed as a cooling fan that blows air to the power storage mechanism, and the exhaust fan is controlled such that a volume of air discharged from the exhaust fan increases in proportion to a volume of air blown by the cooling fan.

In the aforementioned cooling system, the cooling member is formed as a cooling fan that blows air to the power storage mechanism. The exhaust fan is operated such that the volume value of air discharged by the exhaust fan increases in proportion to the volume value of air blown by the cooling fan. This makes it possible to discharge air to the outside of the vehicle by the quantity corresponding to that of blown air.

According to the invention, in a method of cooling a power storage mechanism provided in a vehicle, air that has been heat transferred with the power storage mechanism is released therefrom into an interior of the vehicle, and the heat transferred air is discharged from the interior to an exterior of the vehicle using an exhaust fan.

According to the invention, a vehicle includes a power storage mechanism, a cooling system for the power storage mechanism, and an air conditioning unit that conditions a state of air within the vehicle. In the vehicle, the cooling system for the power storage mechanism is provided with a unit that serves to release air that has been heat transferred with the power storage mechanism therefrom into an interior of the vehicle, and an exhaust fan that discharges the heat transferred air from the interior to an exterior of the vehicle.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Embodiments of the invention will be described referring to the drawings. Hereinafter, the same elements are designated with the same reference numerals, and explanations thereof, thus, will not be repeatedly described.

First Embodiment

Figure 1:
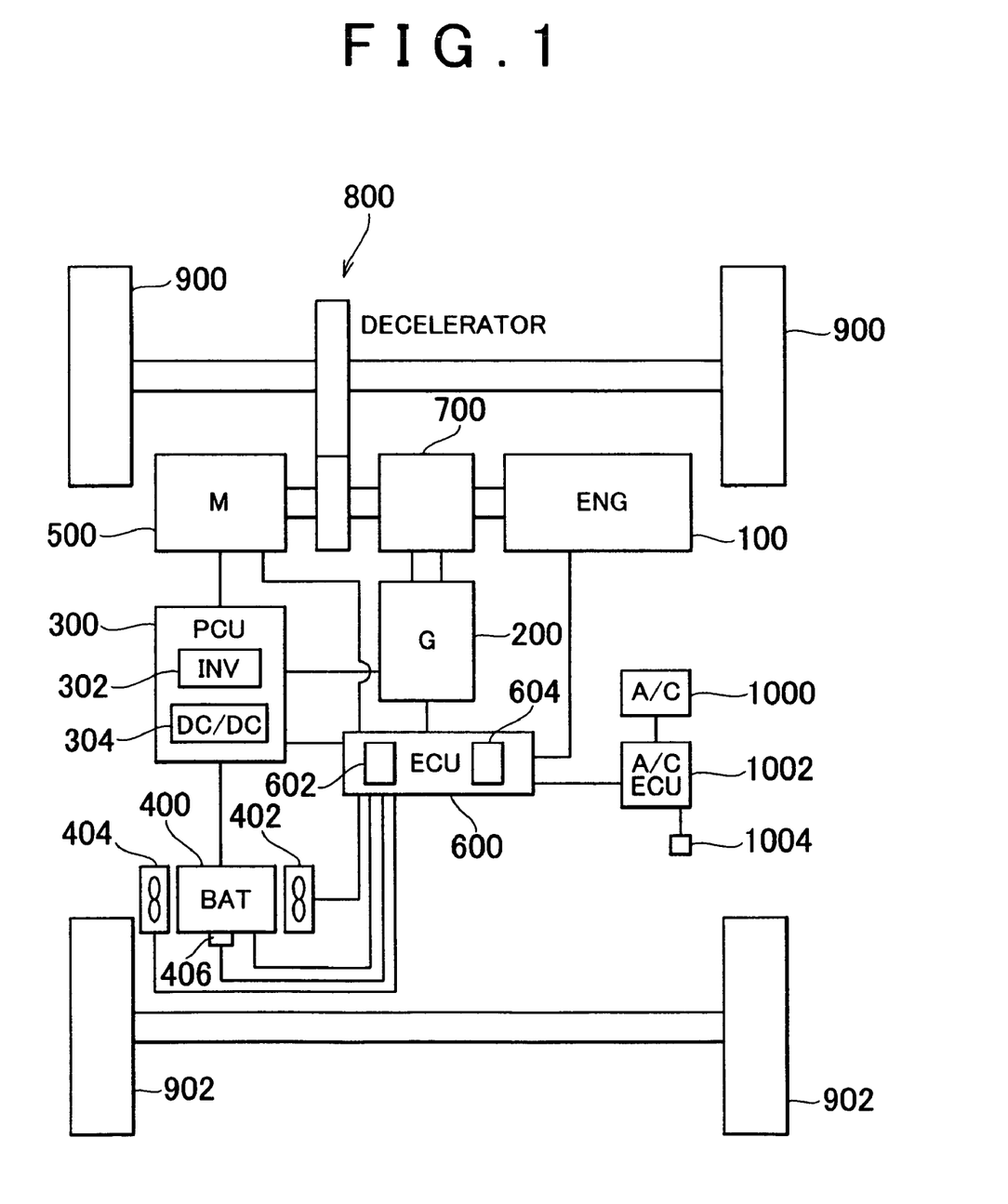
FIG. 1 is a control block diagram that represents a vehicle equipped with a cooling system for a power storage mechanism according to a first embodiment of the invention.

Referring to FIG. 1, a vehicle equipped with a cooling system of a first embodiment according to the invention will be described. The vehicle is equipped with an engine 100, a generator 200, a PCU (Power Control Unit) 300, a battery 400, a motor 500, a hybrid ECU (Electronic Control Unit) 600 connected to all the aforementioned units, an air conditioning (hereinafter referred to as an A/C) unit 1000, and an A/C ECU 1002 connected to the A/C unit 1000.

The vehicle in this embodiment is a hybrid vehicle equipped with the engine 100. However, the vehicle according to the invention is not limited to the hybrid vehicle equipped with the engine 100. The invention may be applied to a hybrid vehicle equipped with a fuel cell (fuel cell vehicle) instead of the engine 100 or an electric vehicle equipped with a battery 400 only.

The power generated by the engine 100 is divided into two channels by a power transfer 700, one channel for driving wheels 900 via a decelerator 800, and the other channel for driving the generator 200 to generate power.

Then the generator 200 generates electricity powered by the engine 100 through the channel divided by the power transfer 700. The electricity generated by the generator 200 may be utilized depending on a vehicle operation state, SOC (State of Charge) of the battery 400, and the like. In the case where the vehicle is running at the normal speed or at a sharp acceleration, the electricity generated by the generator 200 is supplied for driving the motor 500. Meanwhile, in the case where the SOC of the battery 400 measures a value smaller than a predetermined value, the electricity generated by the generator 200 is converted from AC power into DC power by an inverter 302 of the PCU 300, and subjected to voltage regulation using a converter 304 so as to be stored in the battery 400.

The battery 400 is a combination battery formed by connecting a plurality of battery modules each formed of a plurality of cells in series. The battery 400 is provided with a cooling fan 402 that blows cooled air for cooling the battery 400, and an exhaust fan 404 that discharges the cooling air that has been heated through heat transfer with the battery 400 to the outside of the vehicle. Both the cooling fan 402 and the exhaust fan 404 are controlled by the hybrid ECU 600 so as to be operated in accordance with a battery temperature detected by a temperature sensor 406, and an operation state of the A/C unit 1000. A capacitor (condenser) may be employed instead of the battery 400.

The motor 500 is a three-phase motor, and driven by at least one of electricity stored by the battery 400 and electricity generated by the generator 200. The driving force of the motor 500 is transferred to the wheels 900 via the decelerator 800 so as to assist the engine 100 allowing the vehicle to run or so as to allow the vehicle to run only with the driving force supplied from the motor 500.

During regenerative braking of the hybrid vehicle, the motor 500 is driven by the wheels 900 via the decelerator 800 such that the motor 500 functions as a generator. The motor 500 then serves as a regenerative brake for converting the braking energy into electricity. The electricity generated by the motor 500 is stored in the battery 400 via the inverter 302.

The hybrid ECU 600 includes a CPU (Central Processing Unit) 602, and a memory 604. The CPU 602 executes calculation based on a vehicle operation state, an accelerator opening degree detected by an accelerator opening sensor 1100, a change ratio in the accelerator opening degree, a shift position, SOC of the battery 400, and a map and a program stored in the memory 604, and the like. The hybrid ECU 600 controls the equipment of the vehicle such that the vehicle is brought into a desired operation state.

The A/C unit 1000 is selectively operated in the outside air introduction mode for regulating air introduced from the outside air and in the inside air circulation mode for regulating air of the vehicle interior through circulation within the cabin compartment such that the temperature of the vehicle interior is regulated to a desired value. A generally employed technology may be used as the A/C unit 1000, its explanation will not be repeatedly described.

The A/C unit 1000 is connected to the A/C ECU 1002 so as to be controlled based on the switching operation performed by the vehicle operator and a room temperature detected by a room temperature sensor 1004 and the like. The A/C ECU 1002 is connected to the hybrid ECU 600. The A/C ECU 1002 transmits signals indicating the operation state of the A/C unit 1000 and the room temperature of the vehicle detected by the room temperature sensor 1004 to the hybrid ECU 600.

Figure 2:
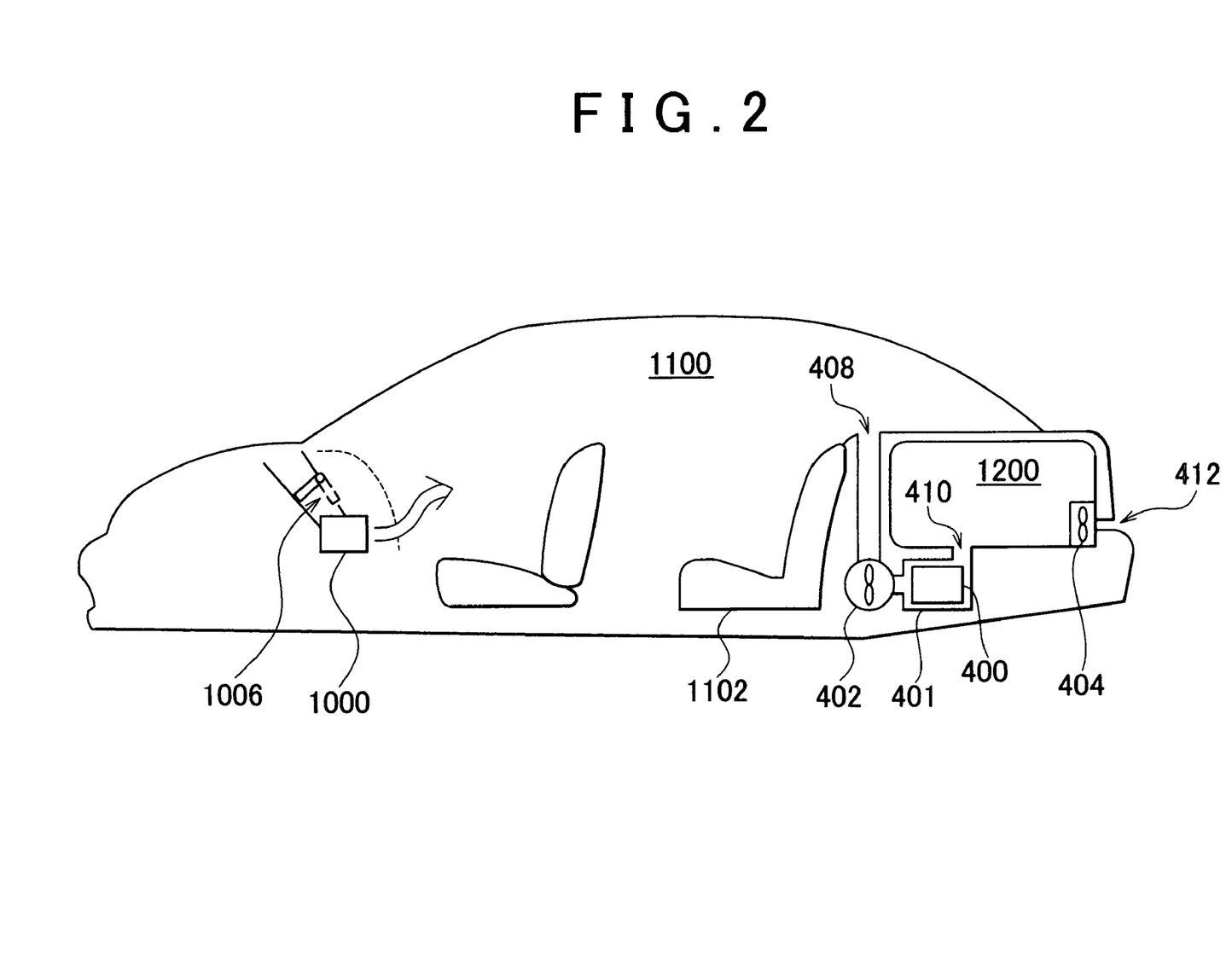
FIG. 2 is a side view of a vehicle of sedan type equipped with the cooling system for the power storage mechanism according to the first embodiment of the invention.

A vehicle equipped with the cooling system according to the embodiment will be described referring to FIG. 2.

The vehicle of sedan type includes two sections, a cabin compartment 1100 and a luggage compartment 1200 to the rear of the cabin compartment 1100. The A/C unit 1000 is built in an instrument panel at the front of the cabin compartment 1100. The A/C unit 1000 includes a selector dumper 1006. The A/C unit 1000 is selectively operated in the outside air introduction mode and the inside air circulation mode by selecting a position of the selector dumper 1006.

The cooling fan 402 is provided to the rear of a rear seat 1102. A battery pack 401 in which the battery 400 is placed within an enclosure is provided to the rear of the cooling fan 402. The cooling fan 402 is communicated with the battery pack 401 via a duct. Each position of the cooling fan 402 and the battery pack 401 is not limited to the position to the rear of the rear seat 1102, but may be positioned downward of the rear seat 1102.

The cooling fan 402 is communicated with the cabin compartment 1100 via an inlet 408 opened in a rear package tray. The cooling air supplied into the battery pack 401 is taken in through the inlet 408. The battery pack 401 is communicated with the luggage compartment 1200 via an exhaust outlet 410. A ventilation hole 412 that opens to the outside of the vehicle is formed in a rear portion of the luggage compartment 1200. An exhaust fan 404 is provided in the luggage compartment 1200 such that the exhaust fan 404 is positioned frontward with respect to the ventilation hole 412.

Figure 3:
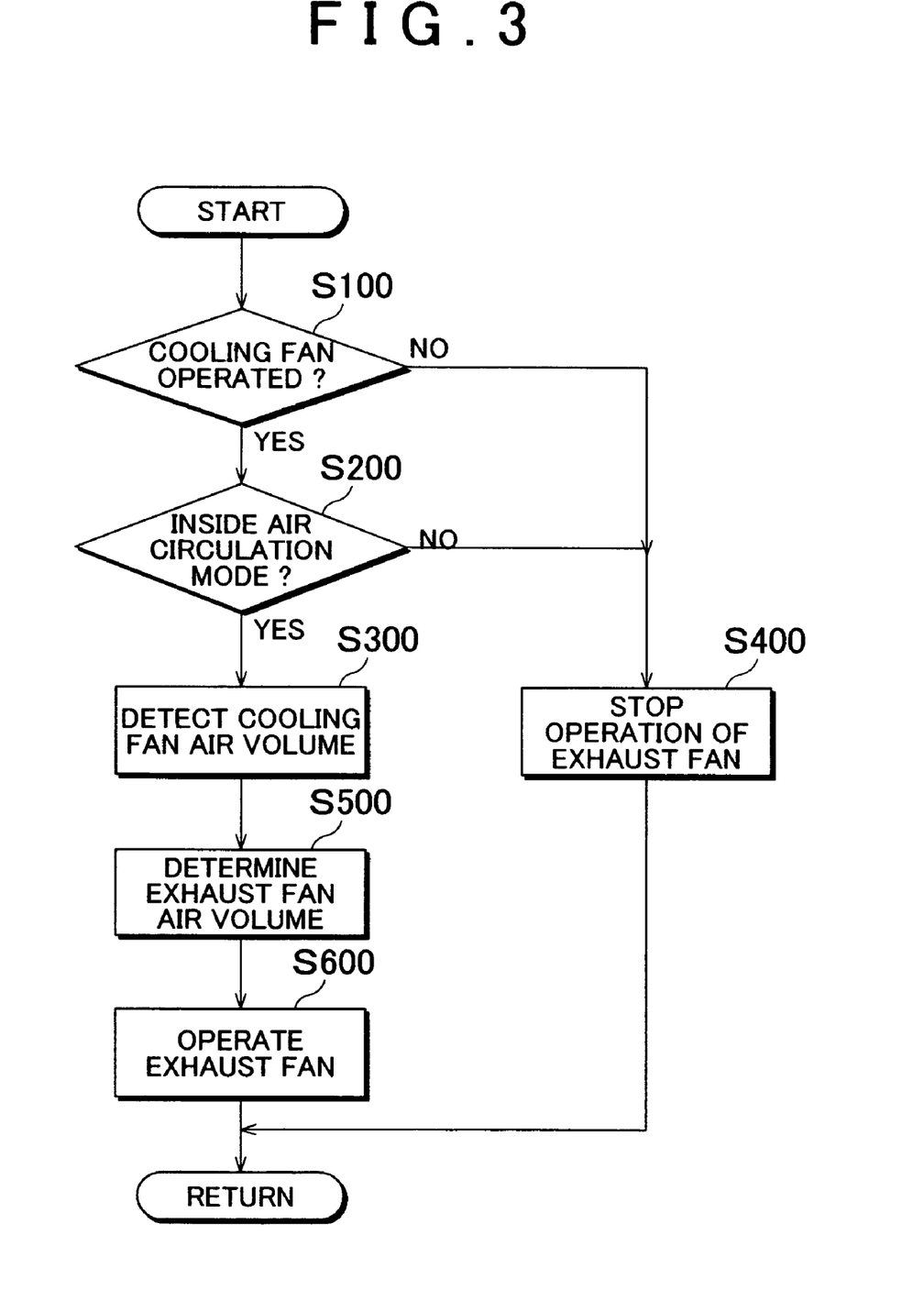
FIG. 3 is a flowchart that shows a control routine of a program executed by an ECU in the cooling system for the power storage mechanism according to the first embodiment of the invention.

The control routine of the program executed by the hybrid ECU 600 in the cooling system according to the embodiment will be described referring to FIG. 3.

In step S100 (hereinafter, "step" will be abbreviated as S), a determination is made by the hybrid ECU 600 whether the cooling fan 402 is in operation. If YES is obtained in S100, that is, the cooling fan 402 is operated, the process proceeds to S200. If NO is obtained in S100, the process proceeds to S400.

In S200, a determination is made by the hybrid ECU 600 whether the A/C unit 1000 is operated in the inside air circulation mode. Such determination may be made based on the signal transmitted from the A/C ECU 1002. If YES is obtained in S200, that is, the A/C unit 1000 is operated in the inside air circulation mode, the process proceeds to S300. If NO is obtained in S200, the process proceeds to S400.

In S300, a volume value of air supplied from the cooling fan 402 is detected by the hybrid ECU 600. The air volume of the cooling fan 402 may be detected based on the signal transmitted from the A/C ECU 1002. In S400, the hybrid ECU 600 interrupts the operation of the exhaust fan 404 (if the exhaust fan 404 has been already stopped, such state is continued.). The operation of the exhaust fan 404 may be restrained compared with the case in the inside air circulation mode instead of completely stopping the exhaust fan 404.

In S500, the air volume of the exhaust fan 404 is determined by the hybrid ECU 600. The air volume of the exhaust fan 404 is increased as the air volume of the cooling fan 402 becomes higher. That is, the air volume of the exhaust fan 404 is determined to be in proportion to that of the cooling fan 402. It may be the case that the exhaust fan 404 is set to zero, in other words, the exhaust fan 404 is not operated. Then in S600, the exhaust fan 404 is operated by the hybrid ECU 600.

The operation of the hybrid ECU 600 structured to execute the aforementioned program represented by the flowchart will be described.

In a running state of the vehicle, it is determined whether the cooling fan 402 is in operation in S100. If NO is obtained in S100, that is, the cooling fan 402 is not operated, the exhaust fan 404 is stopped in S400. Accordingly unnecessary operation of the exhaust fan 404 may be avoided.

If YES is obtained in S100, that is, the cooling fan 402 is operated in a state where the temperature of the battery 400 increases, it is determined in S200 whether the A/C unit 1000 is operated in the inside air circulation mode.

Assuming that the A/C unit 1000 is operated in the inside air circulation mode, that is, YES is obtained in S200, the air volume of the cooling fan 402 is detected in S300. Upon detection of the air volume of the cooling fan 402 in S300, the air volume of the exhaust fan 404 is determined in S500 based on the detected air volume of the cooling fan 402. Then the exhaust fan 404 is operated in S600.

Figure 4:
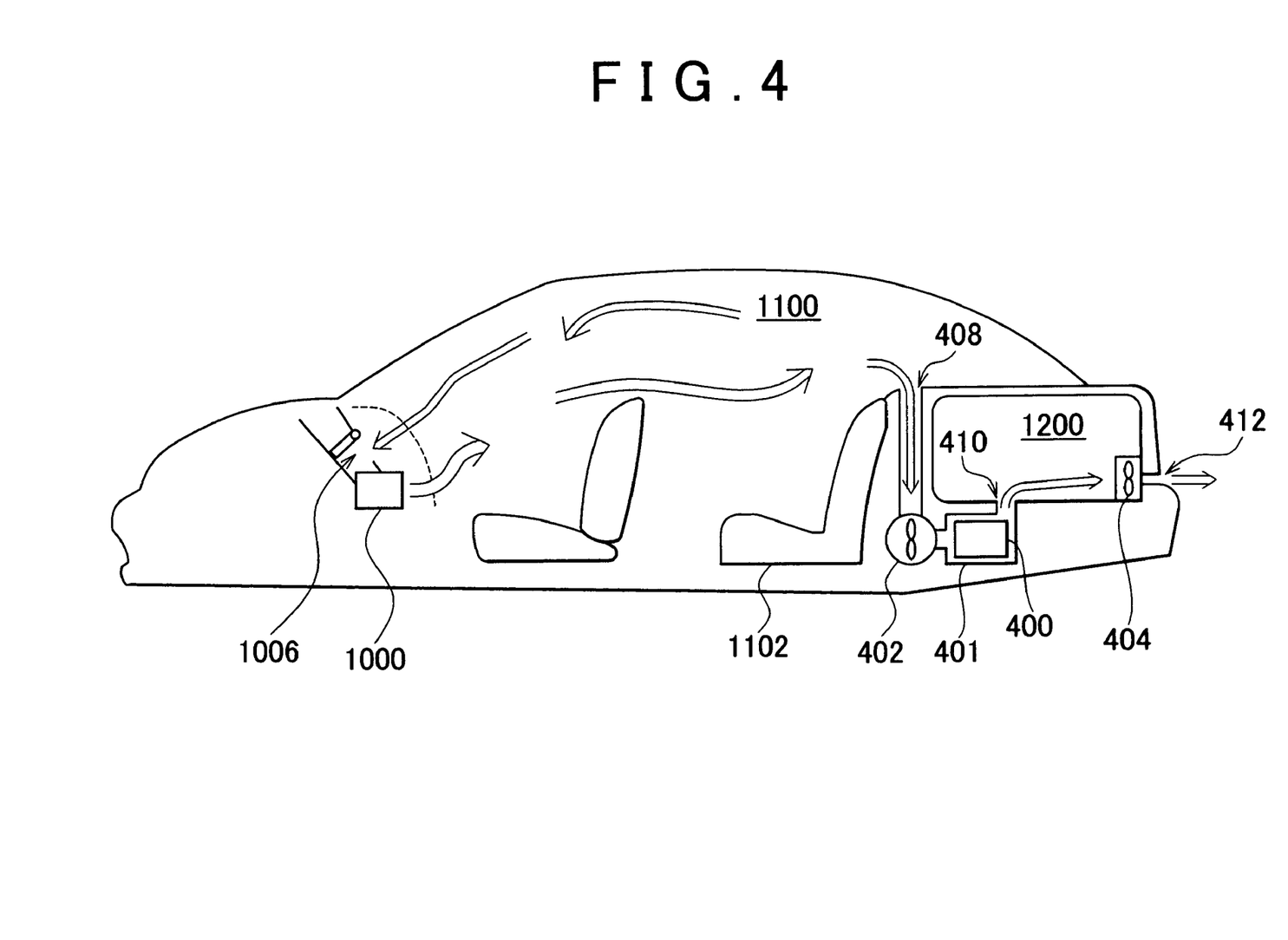
FIG. 4 is a view that represents a cooling air flow in the vehicle equipped with the cooling system for the power storage mechanism according to the first embodiment of the invention in a state where an air conditioning unit is operated at an inside air circulation mode.

In the aforementioned state as shown in FIG. 4, a part of air in the cabin compartment 1100 circulates therein, and the other part of air is taken into the battery pack 401 through the inlet 408 by the cooling fan 402. Air is heat transferred with the battery 400 in the battery pack 401, and the resultant cooling air at the increased temperature is released from the battery pack 401 into the luggage compartment 1200 via an outlet 410. The cooling air released into the luggage compartment 1200 is further discharged to the outside of the vehicle forcedly from the luggage compartment 1200 via a ventilation hole 412.

The cooling air released into the luggage compartment 1200 is discharged to the outside of the vehicle forcedly. Accordingly, this may restrain the cooling air at the temperature increased by the heat transfer from returning to the cabin compartment 1100 through the gap formed in a trim or the rear seat 1102. This may keep the occupant from feeling uncomfortable heat.

Figure 5:
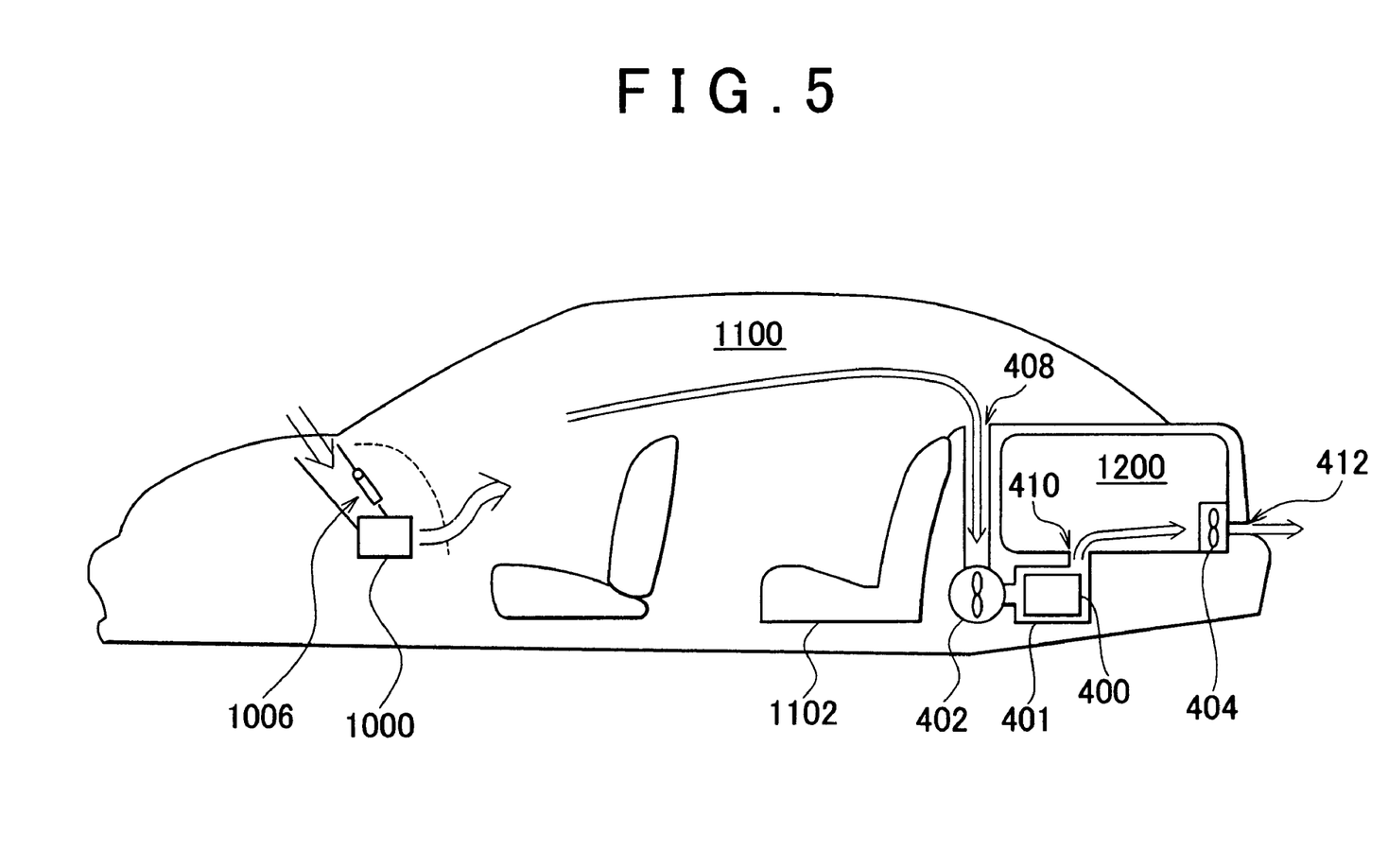
FIG. 5 is a view that represents a cooling air flow in the vehicle equipped with the cooling system for the power storage mechanism according to the first embodiment of the invention in a state where an air conditioning unit is operated at an outside air introduction mode.

If NO is obtained in S200, that is, the A/C unit 1000 is operated in the outside air introduction mode, the exhaust fan 404 is stopped in S400. In this case, the cooling air is introduced from the outside of the vehicle into the cabin compartment 1100 through the A/C unit 1000 as shown in FIG. 5. The cooling air introduced into the cabin compartment 1100 is further admitted into the battery pack 401 by the cooling fan 402 through the inlet 408. The cooling air is then heat transferred with the battery 400 in the battery pack 401. The cooling air at the temperature increased through the heat transfer is released into the luggage compartment 1200 from the battery pack 401 through the outlet 410. The cooling air released into the luggage compartment 1200 is discharged to the outside of the vehicle from the luggage compartment 1200 through the ventilation hole 412 without operating the exhaust fan 404. The operation of the exhaust fan 404 may be restrained compared with the operation in the inside air circulation mode instead of completely stopping the exhaust fan 404.

In the cooling system for the power storage mechanism according to the embodiment, the battery pack is communicated with the luggage compartment with each other through the outlet. The luggage compartment includes the ventilation hole opened to face the outside of the vehicle, and the exhaust fan that functions in discharging the cooling air at the temperature increased by the heat transfer with the battery from the luggage compartment to the outside of the vehicle. The cooling air at the temperature increased by the heat transfer with the battery is forcedly discharged to the outside of the vehicle by using the exhaust fan. This makes it possible to discharge the cooling air at the temperature increased by the heat transfer with the battery pack without providing the duct that is communicated with the outside of the vehicle from the battery pack so as to bypass the luggage compartment.

Second Embodiment

A second embodiment of the invention will be described referring to FIG. 6. In the first embodiment, the cooling system is employed in the vehicle of sedan type including two sections, that is, cabin compartment and a luggage compartment. In this embodiment, the cooling system is employed in the vehicle of wagon (hatch-back) type in which the cabin compartment and the luggage compartment are not sectioned. Other characteristics such as hardware and control routine are the same as those in the first embodiment. The explanation of those characteristics in detail, thus will not be repeatedly described.

Figure 6:
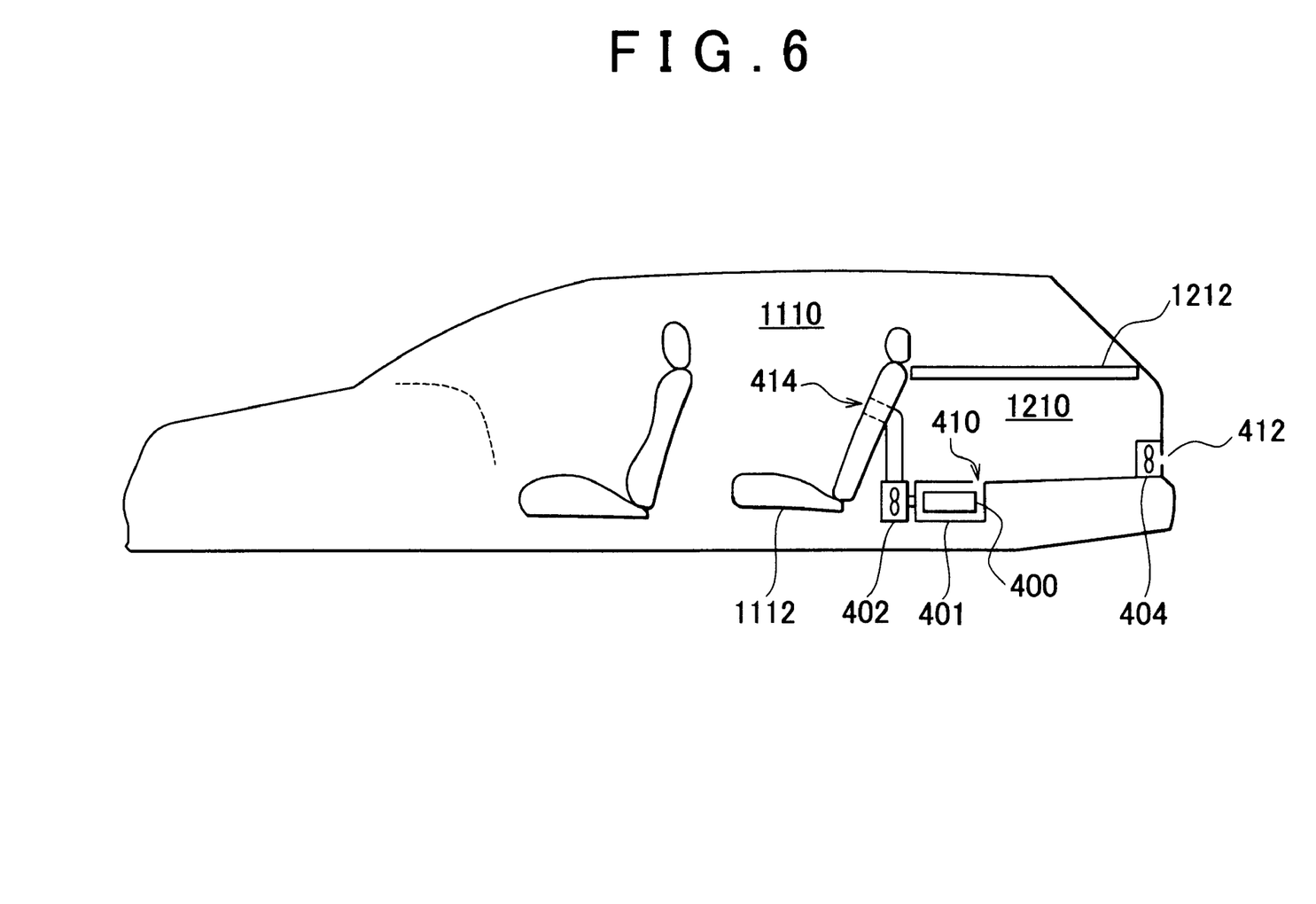
FIG. 6 is a side view of a vehicle of wagon type equipped with the cooling system for the power storage mechanism according to a second embodiment of the invention.

Referring to FIG. 6, the vehicle includes a cabin compartment 1110 and a luggage compartment 1210 that are connected with each other. The cabin compartment 1110 is parted from the luggage compartment 1210 with a tonneau cover 1212. The element that parts between the cabin compartment 1110 and the luggage compartment 1210 is not limited to the tonneau cover 1212, but may be a tonneau board, for example. An inlet 414 is formed in a side portion of a rear seat 1112. The aforementioned structure may provide the same effects as those obtained in the first embodiment.

Third Embodiment

A third embodiment of the invention will be described referring to FIG. 7. In the first embodiment, the cooling system is employed in the vehicle of sedan type including two sections, that is, a cabin compartment and a luggage compartment. In this embodiment, the cooling system is employed in the vehicle of mini van type in which the cabin compartment and the luggage compartment are not sectioned. Other characteristics such as hardware and control routine are the same as those in the first embodiment. The explanation of those characteristics in detail, thus will not be repeatedly described.

Figure 7:
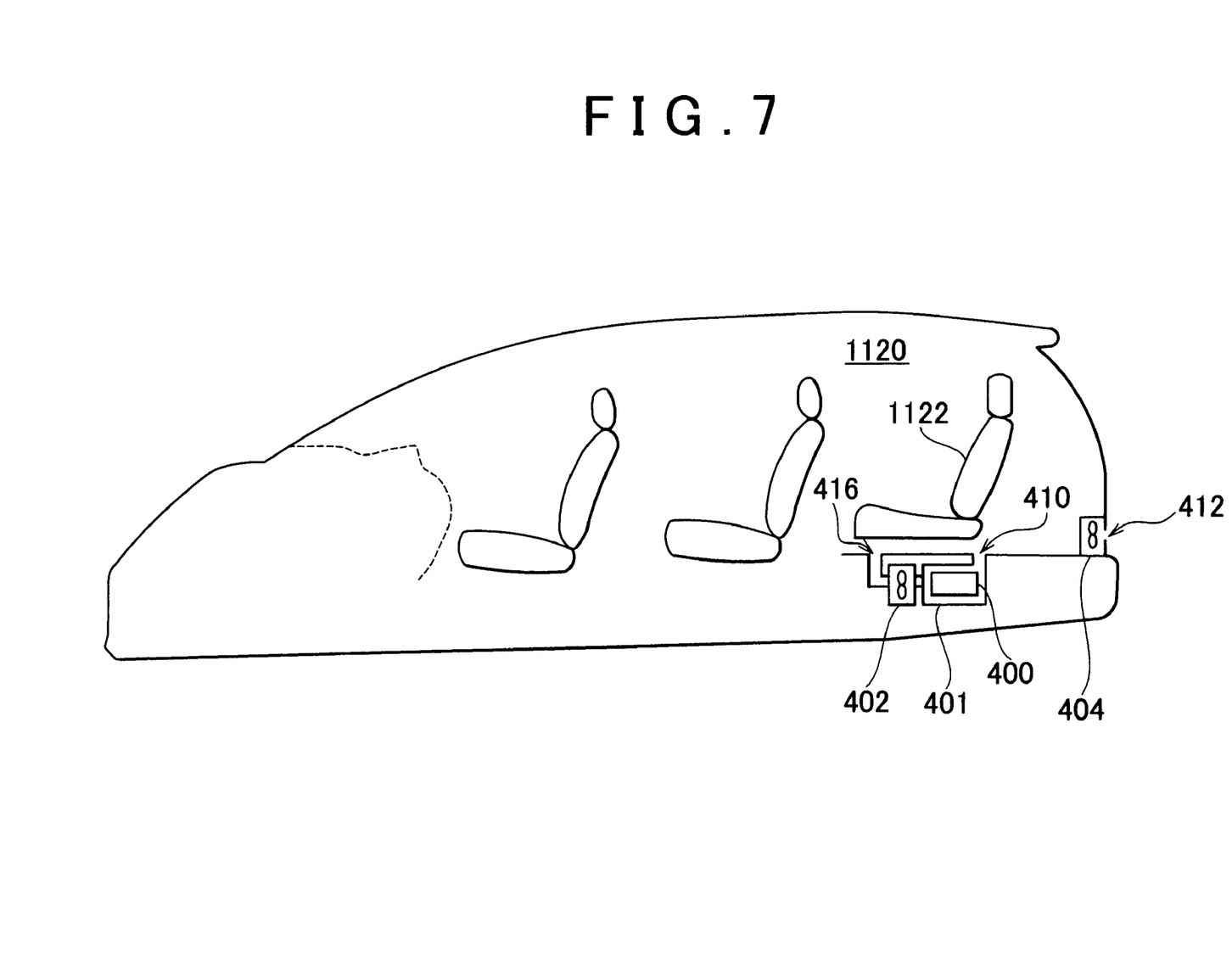
FIG. 7 is a side view of a vehicle of mini van type equipped with the cooling system for the power storage mechanism according to a third embodiment of the invention.

As shown in FIG. 7, the vehicle includes a cabin compartment 1120 and a third seat 1122 provided at a rear of the compartment 1120. An inlet 416 is formed at a position downward of the third seat 1122. An outlet 410 is formed at a position to the rear of the third seat 1122. The cooling air at the temperature increased by the heat transfer with the battery 400 is released rearward of the third seat 1122 in the compartment 1120. The rear space of the third seat 1122 may be structured as the luggage compartment. The same effects as those of the first embodiment may be obtained in this embodiment.

It is to be understood that the embodiments of the invention are described for purposes of illustration and not for limitation. The scope of the invention, thus, is to be determined solely by the appended claims, and the claims include all modifications in the equivalents within the scope of the invention.

What is claimed is:

1. A cooling system for a power storage mechanism provided in a vehicle, comprising:

a unit that serves to release air that has been heat transferred with the power storage mechanism therefrom into an interior of the vehicle; and an exhaust fan that discharges the heat transferred air from the interior to an exterior of the vehicle, wherein the vehicle is equipped with an air conditioning unit that conditions a state of air, and a control unit is provided for controlling an operation of the exhaust fan in accordance with an operation of the air conditioning unit, wherein the air conditioning unit includes a member that serves to take in air from the exterior into the interior of the vehicle, and the control unit serves to restrain an operation of the exhaust fan when the air is taken in from the exterior into the interior of the vehicle.

2. A cooling system for a power storage mechanism provided in a vehicle, comprising:

a unit that serves to release air that has been heat transferred with the power storage mechanism therefrom into an interior of the vehicle; and an exhaust fan that discharges the heat transferred air from the interior to an exterior of the vehicle, wherein the vehicle is equipped with an air conditioning unit that conditions a state of air, and a control unit is provided for controlling an operation of the exhaust fan in accordance with an operation of the air conditioning unit, wherein the air conditioning unit includes a member takes in air from the exterior into the interior of the vehicle, and a member circulates air within the interior of the vehicle; and the control unit serves to operate the exhaust fan at a mode in which the air within the interior of the vehicle, and to restrain an operation of the exhaust fan in a mode in which air is taken in from the exterior into the interior of the vehicle.

3. A cooling system for a power storage mechanism provided in a vehicle, comprising:

a unit that serves to release air that has been heat transferred with the power storage mechanism therefrom into an interior of the vehicle;

an exhaust fan that discharges the heat transferred air from the interior to an exterior of the vehicle; and a cooling member that cools the power storage mechanism, and a control unit for controlling an operation of the exhaust fan in accordance with an operation of the cooling member, wherein the cooling member comprises a cooling fan that blows air to the power storage mechanism, and the exhaust fan is controlled such that a volume of air discharged from the exhaust fan increases in proportion to a volume of air blown by the cooling fan.

4. A method of cooling a power storage mechanism provided in a vehicle, comprising the steps of:

releasing air that has been heat transferred with the power storage mechanism therefrom into an interior of the vehicle; and discharging the heat transferred air from the interior to an exterior of the vehicle using an exhaust fan, wherein an operation of the exhaust fan is controlled in accordance with an operation of an air conditioning unit provided in the vehicle, wherein when the air conditioning unit is operated to take in air from the exterior into the interior of the vehicle, an operation of the exhaust fan is restrained.

5. A method of cooling a power storage mechanism provided in a vehicle, comprising the steps of:

releasing air that has been heat transferred with the power storage mechanism therefrom into an interior of the vehicle; and discharging the heat transferred air from the interior to an exterior of the vehicle using an exhaust fan, wherein an operation of the exhaust fan is controlled in accordance with an operation of an air conditioning unit provided in the vehicle, wherein when the air conditioning unit is operated in a state in which the air within the interior of the vehicle is circulated, the exhaust fan is operated, and when the air conditioning unit is operated in a state in which air is taken in from the exterior into the interior of the vehicle, the operation of the exhaust fan is restrained.

6. A method of cooling a power storage mechanism provided in a vehicle, comprising the steps of:

releasing air that has been heat transferred with the power storage mechanism therefrom into an interior of the vehicle; and discharging the heat transferred air from the interior to an exterior of the vehicle using an exhaust fan, wherein the power storage mechanism is cooled by a cooling member, and an operation of the exhaust fan is controlled in accordance with an operation of the cooling member, wherein the cooling member comprises a cooling fan that blows air to the power storage mechanism, and the operation of the exhaust fan is controlled such that a volume of air discharged from the exhaust fan increases in proportion to a volume of air blown by the cooling fan.

7. A vehicle including a power storage mechanism, comprising:

a cooling system for the power storage mechanism, wherein the cooling system for the power storage mechanism is provided with a unit that serves to release air that has been heat transferred with the power storage mechanism therefrom into an interior of the vehicle, and an exhaust fan that discharges the heat transferred air from the interior to an exterior of the vehicle; and an air conditioning unit that conditions a state of air within the vehicle and a control unit that controls an operation of the exhaust fan in accordance with an operation of the air conditioning unit, wherein the air conditioning unit includes a member that serves to take in air from the exterior into the interior of the vehicle, and the control unit serves to restrain an operation of the exhaust fan when the air is taken in from the exterior into the interior of the vehicle.

8. A vehicle including a power storage mechanism, comprising:

a cooling system for the power storage mechanism, wherein the cooling system for the power storage mechanism is provided with a unit that serves to release air that has been heat transferred with the power storage mechanism therefrom into an interior of the vehicle, and an exhaust fan that discharges the heat transferred air from the interior to an exterior of the vehicle; and an air conditioning unit that conditions a state of air within the vehicle and a control unit that controls an operation of the exhaust fan in accordance with an operation of the air conditioning unit, wherein the air conditioning unit includes a member take in air from the exterior into the interior of the vehicle, and a member circulates air within the interior of the vehicle, and the control unit serves to operate the exhaust fan in a mode in which the air within the interior of the vehicle is circulated, and to restrain the operation of the exhaust fan in a mode in which air is introduced from the exterior into the interior of the vehicle.

9. A vehicle including a power storage mechanism, comprising:

a cooling system for the power storage mechanism, wherein the cooling system for the power storage mechanism is provided with a unit that serves to release air that has been heat transferred with the power storage mechanism therefrom into an interior of the vehicle, and an exhaust fan that discharges the heat transferred air from the interior to an exterior of the vehicle; and a cooling member that cools the power storage mechanism, and a control unit for controlling an operation of the exhaust fan in accordance with an operation of the cooling member, wherein the cooling member comprises a cooling fan that blows air to the power storage mechanism, and the exhaust fan is controlled such that a volume of air discharged from the exhaust fan increases in proportion to a volume of air blown by the cooling fan.

* * * * *

UNITED STATES PATENT AND TRADEMARK OFFICE
CERTIFICATE OF CORRECTION

PATENT NO. : 7,451,608 B2 Page 1 of 1
APPLICATION NO. : 11/016739
DATED : November 18, 2008
INVENTOR(S) : Yoshiaki Kikuchi It is certified that error appears in the above-identified patent and that said Letters Patent is hereby corrected as shown below:

| Column | Line | |
|---|---|---|
| 1 | 41 | Change "drive" to --operation--. |
| 8 | 44 | Change "takes" to --that serves to take--. |
| 10 | 25 | After "member" insert --that serves to--. |

Signed and Sealed this

Twenty-eighth Day of July, 2009

JOHN DOLL
*Acting Director of the United States Patent and Trademark Office*